(12) United States Patent
Bauer et al.

(10) Patent No.: US 7,718,062 B2
(45) Date of Patent: May 18, 2010

(54) WASTEWATER PURIFICATION PLANT BY MEANS OF PLANTS

(75) Inventors: Hartmut Bauer, Fußgönheim (DE); Frank Kozianka, Mannheim (DE); Sandra Endisch, Mannheim (DE)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 11/579,582

(22) PCT Filed: May 9, 2005
(Under 37 CFR 1.47)

(86) PCT No.: PCT/EP2005/052081

§ 371 (c)(1),
(2), (4) Date: Dec. 20, 2007

(87) PCT Pub. No.: WO2005/108310

PCT Pub. Date: Nov. 17, 2005

(65) Prior Publication Data

US 2009/0001002 A1    Jan. 1, 2009

(30) Foreign Application Priority Data

| May 7, 2004 | (DE) | .................... 10 2004 023 170 |
| Jun. 11, 2004 | (DE) | .................... 10 2004 028 250 |
| Jul. 6, 2004 | (DE) | .................... 10 2004 032 644 |
| Nov. 3, 2004 | (DE) | .................... 10 2004 052 813 |
| Nov. 25, 2004 | (WO) | ............... PCT/EP2004/053100 |
| Apr. 12, 2005 | (DE) | .................... 10 2005 016 874 |

(51) Int. Cl.
*C02F 3/32* (2006.01)

(52) U.S. Cl. .................... 210/602; 210/259

(58) Field of Classification Search .......... 210/602, 210/252, 259; 47/59 R
See application file for complete search history.

(56) References Cited

U.S. PATENT DOCUMENTS

| 4,333,837 A | * | 6/1982 | Plosz et al. | ............... 210/602 |
| 6,322,699 B1 | * | 11/2001 | Fernandez | ............... 210/602 |

(Continued)

FOREIGN PATENT DOCUMENTS

DE    4339905 C1 * 11/1994

(Continued)

*Primary Examiner*—Fred Prince

(57) ABSTRACT

A waste water purification plant purifies water by means of plants and a waste water purification process. The waste water purification plant has at least one plant container, a feed unit, an evacuation unit and plants. Waste water to be purified can be supplied to the purification plant by the feed unit. Purified waste water can be discharged from the purification plant by the evacuation unit. The plants are arranged in the plant container without a substrate. A plant container preferably has at least two plant basins. At least one other container can be provided. At least part of the plant container is arranged on the roof of a building. Plants of at least two different plant species are provided in the plant container. Depending on the type of waste water for example industrial and/or sanitary waste water the waste water to be purified may be purified in a predeterminable sequence by the plants of the different plant species. This purification plant makes it possible to purify industrial and/or sanitary waste water, i.e. it is applicable to industries and/or private homes. In particular, the waste water purified by the purification plant should possess a high degree of purity, for example that of drinking water.

20 Claims, 7 Drawing Sheets

U.S. PATENT DOCUMENTS

| | | | |
|---|---|---|---|
| 6,406,627 B1 * | 6/2002 | Wallace | 210/602 |
| 2002/0007591 A1 * | 1/2002 | Mischo | 47/65.9 |
| 2006/0070299 A1 * | 4/2006 | Furumura et al. | 47/69 |

FOREIGN PATENT DOCUMENTS

| | | | |
|---|---|---|---|
| DE | 19630831 A1 * | 2/1998 | |
| DE | 19750276 A1 * | 5/1999 | |
| GB | 2375761 A * | 11/2002 | |
| WO | WO 99/32406 A * | 7/1999 | |
| WO | WO 01/27039 A * | 4/2001 | |

* cited by examiner

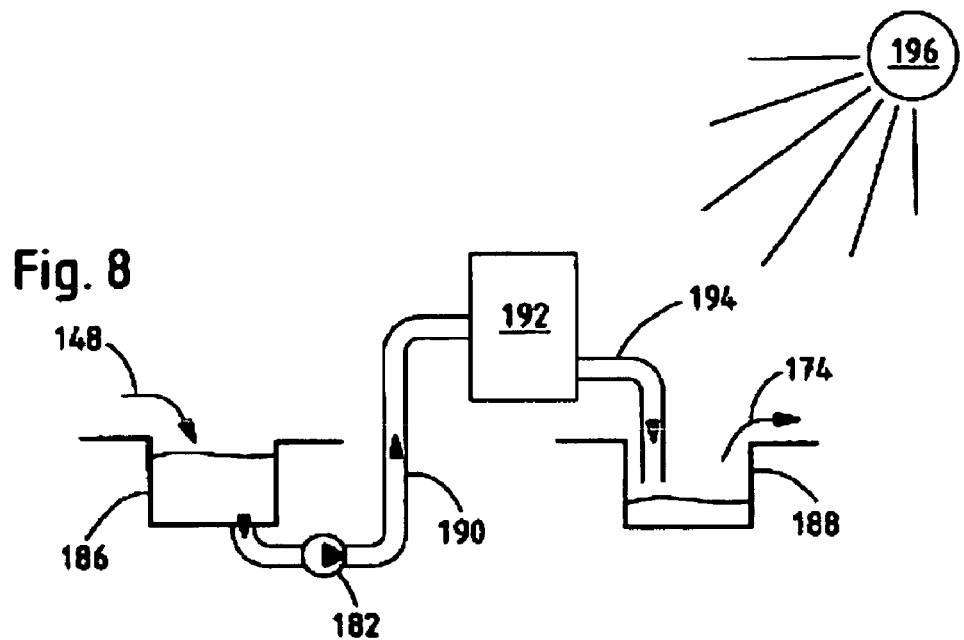
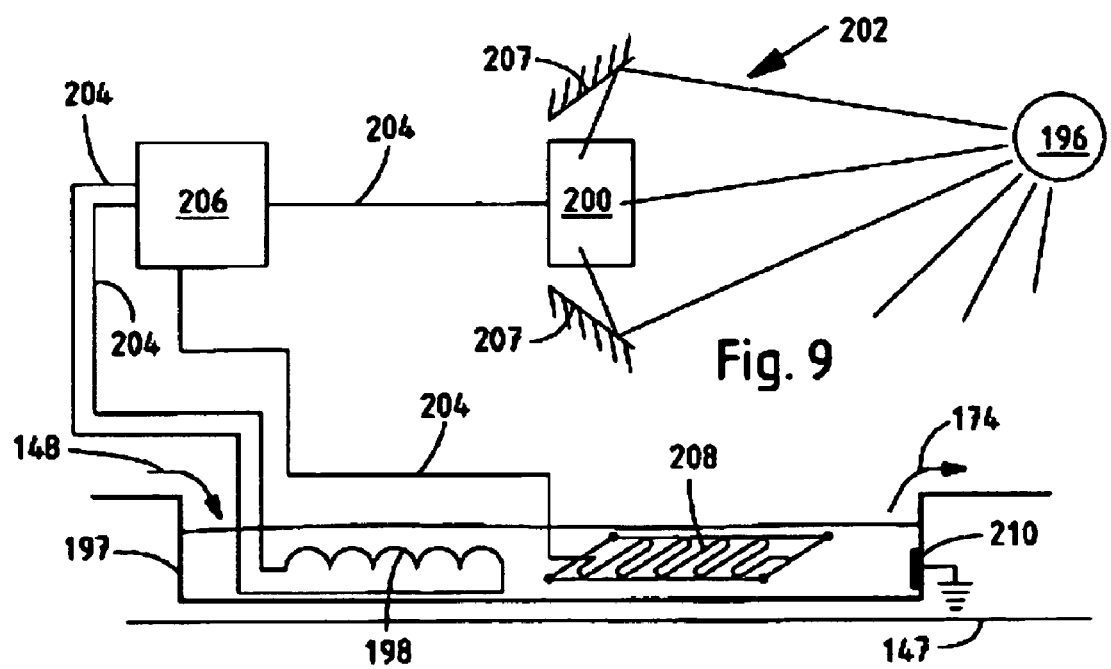

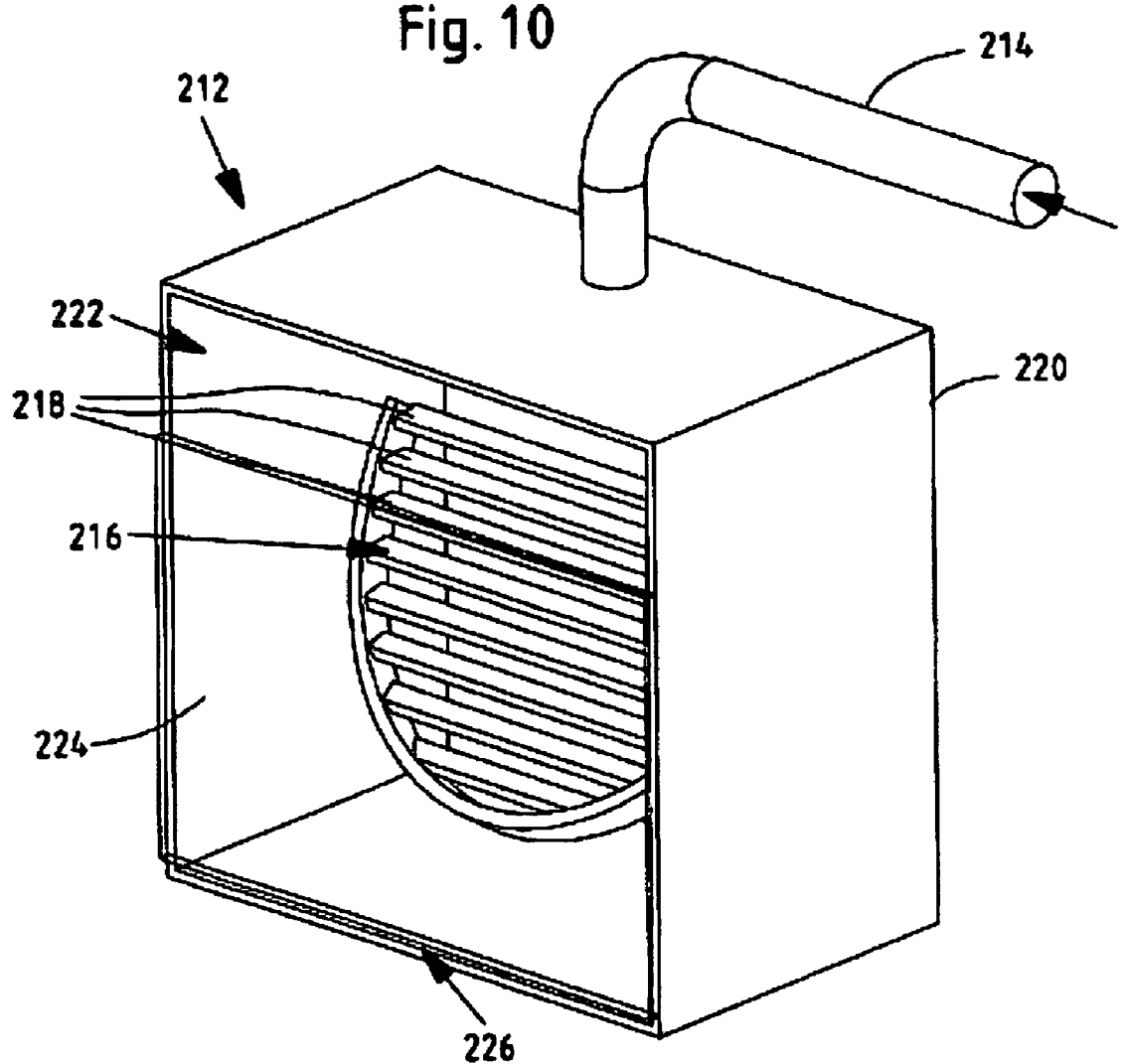

WASTEWATER PURIFICATION PLANT BY MEANS OF PLANTS

FIELD OF THE INVENTION

The invention concerns a plant-based sewage treatment system for purification of wastewater and a method for purification of wastewater.

BACKGROUND OF THE INVENTION

Various production-related wastewaters arise in many industrial concerns. Normally, wastewater is purified in sewage treatment plants by industrial processes. The so-called nature-like methods have already been used as an alternative to traditional sewage plants for some time now for the purification of small streams or small amounts of wastewater. When using nature-like methods the self-cleaning mechanisms of nature of utilized and moreover, new wet biotopes and green areas are created. In addition, such natural methods bring considerable cost savings.

Natural treatment systems, such as plant (vegetation)-based sewage treatment systems, are already being used in many places. A plant-based sewage treatment system is based on biological symbiosis between specially grown water plants and microorganisms, for example, bacteria, fungi and algae.

Current plant-based sewage treatment systems are mainly operated by private households and communes and are mostly used where connection to a central wastewater purification system is too costly. In these systems the plants are planted on earth, gravel or sand (i.e., in substrate). However, usually the plant-based wastewater purification facilities require relatively large areas, which are mostly not available, especially in industrial concerns. Purely for exemplary purposes reference is made to DE 196 30 831 C2, from which a sewage treatment system is known.

It is therefore desirable to provide a vegetation plant-based sewage treatment system and a method for purifying wastewater which overcomes the problems described above.

SUMMARY OF THE INVENTION

Accordingly, an object of this invention is to provide a industrial or sanitary wastewater sewage treatment system which is useable for industrial concerns or private households.

A further object of the invention is to provide such a sewage treatment system wherein the treated wastewater should have a high degree of purity, for example, that of drinking water.

These and other objects are achieved by the present invention, wherein a sewage treatment system consists of plant container, a feed unit, a discharge unit, and plants. The feed unit communicates wastewater to be purified to the sewage treatment system. The discharge unit removes purified wastewater from the sewage treatment system. The plants are arranged in the plant container without a substrate. The plant container preferably includes at least two plant basins. At least one additional container can be provided. At least part of the plant container is arranged on the roof of a building. Plants of at least two different species are placed in the plant container. Depending on the type of wastewater, for example, industrial and/or sanitary wastewater, the wastewater to be purified can be purified in a preset sequence of plants of different species.

Plants are used, whose roots have, after special cultivation, formed so that they situate themselves at a specific site in water without a substrate and in particular remain there, for example, on the bottom of the plant container. If the plant container is provided with a pond liner, the plants stand directly on this pond liner. These plants purify the wastewater that is passed through the plant container in their root space in symbiosis with the microorganisms that live there. Deposits can form over time but these should not be considered to fall under the term "substrate" in the sense of this invention. The term "substrate" in the sense of this invention is rather a bottom system with a natural sediment, such as described in ATV Handbook, "Biological and More Far-reaching Wastewater Purification," Ernst and Sohn, Berlin, 4th Edition, 1997, or a synthetically composed sediment of various components. In contrast, the deposits can be removed from time to time. Suitable plants have developed so that they are matched to climatic properties of the wastewater.

Basically, the roof can be a flat roof or a peaked roof. A flat roof is usually found in industrial buildings or bungalows while a peaked roof is found in particular in private dwellings. Accordingly, it is intended that the sewage treatment system in accordance with the invention be used or utilized both industrially and in the private field.

Really particularly preferably, this invention concerns a sewage treatment system for purification of wastewater as disclosed in the patent applications with the official file numbers DE 10 2004 023 170, PCT/EP2004/053100, DE 10 2004 028 250, DE 10 2004 032 644, DE 10 2004 052 813 and DE 10 2005 016 874, where the content of the disclosure of these patent applications is to be incorporated in its entirety here and to which reference will be made below.

Ideally, the plants of different species are arranged in a certain sequence in the basins, where the sequence of the arrangement of the plants of different species can be specially adjusted to the properties of the wastewater that is to be treated, for example, the degree of contamination, the pH, the salt content, and/or the heavy metal content. The sequence of plants species here is matched to the type of wastewater to be purified, namely, in order to get rid of as many as possible of the pollutants, heavy metals and other chemical compounds from the treated water. Correspondingly, the sewage treatment system in accordance with the invention could be specially configured to a specific type of wastewater with regard to the arrangement of the sequence of different plant species, and then only wastewater of this kind is purified by the facility. Alternatively, the sewage treatment system in accordance with the invention could be designed so that different kinds of wastewater can be purified with it, for example, by passing the wastewater that is to be purified in each case through a variable sequence of plants of different species or purifying it by the corresponding plants. Thus, a sewage treatment system that is flexibly useable for wastewater of many different kinds results in an especially advantageous way, so that, for example, on one day only sanitary wastewater may be purified and in a subsequent period of time only industrial wastewater is purified.

Plants of the following species are really especially preferred for the sewage treatment system in accordance with the invention: *Carex riparia* and/or *Carex elata* and/or *Carex gracilis* and/or *Juncus inflexus* and/or *Carex acutiformis* and/or *Scirpus lacustris* and/or *Iris pseudacorus* and/or *Carex rostrata* and/or *Phragmitis australis* and/or F2, where F2 is a cross of *Carex gracilis* and *Carex elata*.

Some properties of plants of the species *Carex riparia* (pond sedge) are given below:

Phosphate elimination: *Carex riparia* is essentially responsible for phosphate elimination in a wastewater stream. At a volume flow rate of supplied wastewater of about 1.2 m3/h an average of 21% phosphates can be eliminated or degraded in the day and 40% at night with this plant. This corresponds to an effective phosphate elimination of 300 to 1000 mg/L. The measurement values given here refer to an exemplary sewage treatment system that has an effective surface of about 140 m2 with a flow rate of 1.2 m3/h.

COD degradation (COD=chemical oxygen demand): *Carex riparia* is capable of reducing the COD content of the wastewater stream by 40% in the day and 13% at night. This corresponds to a reduction of 200 to 500 mg/L. It can be assumed from this that this concerns mainly readily degradable carbon compounds.

H18 (measurement method for determining oil in water): Under normal conditions *Carex riparia* can convert 3 mg/L sparingly soluble mineral oil carbons so that they can be absorbed by the plants. It shows excellent properties in accident conditions (H18 accident) and is capable of cushioning such a shock load to a certain degree and coping with it without being damaged (H18 elimination, or uptake/buffering of about 500 mg/L).

Oxygenation: It was shown in measurements that the oxygen content in wastewater is sufficient to maintain aerobic conditions in the basin, specifically both in daytime and nighttime operation. In the measurements the degree of saturation of the wastewater was between 30 and 50%, both in the day and at night.

Because of these properties it is advantageous to position *Carex riparia* at an inlet to a primary basin or plant basin of the sewage treatment system in accordance with the invention. In addition it turned out that *Carex riparia* was the best oxygenation in the system, of the tested *Carex* species (3.89 to 4.76 mg/L). It also forms a closed root carpet, with a pronounced biofilm in the middle root regions. Thus, the area formation with this plant is especially pronounced. The thickness of the biofilm can be comparable, for example, to that of *Carex paniculata*.

*Carex elata* (stiff sedge) plays an important role in a sewage treatment system for sanitary purposes. It has the following properties:

It grows and can also be used in shade/semi-shade

Oxygenation: cut 3.71 mg/L, uncut 3.61 mg/L [Sat03]. These values clearly show that the process of photosynthesis of the plants does not have a significant effect on oxygenation.

Storage of nutrients

Cleavage of C compounds (carbon compounds)

Ammonium degradation: about 50%

Nitrate degradation: about 70%

Nitrite degradation: about 30%

Degradation rate of pathogens: about 50%

The abbreviation "Sat03" is used to designate the work of Miriam Sartor entitled "Energy Balancing for a Rooftop Plant-based Wastewater Purification System without Bottom Sediment (PWTR) with Consideration of the Amount of Oxygen Introduced by Phytolysis Plants®, Department of Environmental Protection, John Deere Works, Mannheim, 2003.

The plant *Carex elata* is very well suited for the degradation of nitrogen compounds and at the same time for reduction of disease pathogens. Oxygenation is average (0.23 mg/Lh=0.23 milligram/(liter·hour)). It can be used together with *Carex rostrata* and then compensate the oxygen deficiency and keep anaerobic conditions from being promoted. It is capable of cushioning and remedying impact loads.

Plants of the species *Juncus inflexus*, for example, the blue-green rush, have the properties given below:

Oxygenation: cut 6.40 mg/L, uncut 5.60 mg/L [Sat03]

Advantage: they can transfer oxygen (O2) directly into water (H2O) via the stalks and absorb and/or convert and/or degrade ballast substances like phenols, phosphates NaCl and other salts and also release them into the atmosphere.

Does not stop growing completely in any season

It can be matched to quite varied wastewater rates

Elimination of pathogens: about 80% [Sei78]

Ammonium degradation: about 40%

COD degradation: about 30%

The abbreviation [Sei78] is used to designate the "Contributions to Maintaining Water Quality," by K. Seidel, H. Happel, G. Graue, The Foundation of the Limnological Working Group, Dr. Seidel e.V., Krefeld-Hülserberg, 2nd Edition, 1978.

The plant *Juncus inflexus* can be put in one of the first basins of a sewage treatment system because of its high oxygenation and the high reduction of pathogens. It has the highest oxygenation (18 mg/Lh). However, over time *Juncus inflexus* does deposit solids or biomass in the basin, since the bottom is not completely covered by root carpet. Because of this fewer pollutants are degraded. For this reason cleaning of the basin should take place from time to time.

Plants of the plant species *Carex acutiformis* have, among other things, low oxygenation, which amounts to 2.52 mg/L for cut plants and 3.03 mg/L for uncut plants [Sat03]. Up to now nothing positive can be made with respect to *Carex acutiformis*, since it did not show notable positive degradation rate of chemical parameter at any point in time. Thus, this plant could be removed, for example, from a sanitary sewage treatment system. Because of low oxygenation (0.15 mg/Lh) it can be used with *Iris pseudacorus*.

The plants of the species *Iris pseudacorus* have the following properties:

High oxygenation: cut 6.06 mg/L, uncut 4.88 mg/L [Sat03]

Elimination of phosphate: about 50%

Nitrite degradation: about 55%

COD degradation: about 50%

Degradation of *E. coli*: about 50% [Sei78]

Degradation of enterococci: about 20% [Sei78]

*Iris pseudacorus* could thus be used mainly due to its properties of good degradation of *E. coli* and absolutely good degradation of nitrite, in a sanitary sewage treatment system. Because of its high oxygenation it can be used in particular in combination with plants that have low oxygenation. *Iris pseudacorus* has a very, very high oxygenation (1.92 mg/Lh) and therefore is used in combination with *Carex acutiformis* which has poor oxygenation. The degradation power of *Iris pseudacorus* is excellent. In addition, it can eliminate phosphate. Also, it is poisonous.

The plant species F2 (it is also called gracel) is a cross of *Carex gracilis* (slender sedge) (mother) [stand-forming] and *Carex elata* (stiff sedge) (father) [host-forming]. Their properties are, among others:

Average oxygenation

Degradation of ammonium: about 50%

Degradation of nitrate: about 71%

Degradation of nitrite: about 33%

Degradation of COD: about 40%

F2 is very well suited for degradation of nitrogen compounds and reduction of the COD. The degradation power of F2 could also be extended in particular to microbiological parameters.

*Scirpus lacustris* or common clubrush has recently also been given the name *Schoenoplectus lacustris*. Its properties can be summarized as follows:

Enrichment of the environment with bacteria and humus
Degradation of pathogens (*E. coli*, coliform bacteria): about 80% [Sei78]
Degradation of antibiotics [Sei78]
Use in shallow water [Sei78]
Keeps biotope clean
Absorption of heavy metals (use: for industrial wastewater)
Storage of nutrients
Cleavage of C compounds (carbon compounds)
Degradation of hydrocarbons It is probable in the case of *Scirpus lacustris* that it exhibits very good degradation of disease pathogens and positive elimination of phosphate. The plant *Scirpus lacustris* can absorb heavy metals (for example, phosphate), store nutrients and cleave carbon compounds. In addition, it can degrade hydrocarbons and is suitable for a low water depth. By its cleaning activity it keeps the biotope clean.

The properties of additional plant species that can be used in sewage treatment systems, whether for treatment of sanitary and/or industrial wastewater, are listed below:

*Carex rostrata* (beaked sedge): could be used, for example in combination with *Carex elata*, since *Carex rostrata* has the lowest oxygenation (0.17 mg/Lh);

*Phragmites communis* (reed): also brings oxygen into the wastewater and is capable of cleaving certain organic compounds;

*Carex paniculata* (panicle sedge): has poor oxygenation (0.16 mg/Lh), but, on the other hand, it has a high water absorption capacity and, with that, high evaporation rate. Through it the wastewater can be drastically reduced. However, on the one hand, this could at least in some areas dry out the sewage treatment system if there is already too little wastewater. On the other hand, it could produce a "concentrating" of the wastewater to be purified, i.e., crossing an optionally preset pollutant limit. However, *Carex paniculata* grows very thickly and because of that becomes very heavy, which is problematic especially in the case of sewage treatment systems on the roofs of buildings, for reasons of static [weight].

For purification of sanitary wastewater, in a preferred embodiment of a sewage treatment system in accordance with the invention the sequence of plants of different plant varieties is as follows: (a) *Juncus inflexus*, (b) *Iris pseudacorus*, (c) F2, (d) *Carex elata*, (e) *Scirpus lacustris*, (f) *Iris pseudacorus*. The plant species (e) *Scirpus lacustris* and (f) *Iris pseudacorus* could be mixed with each other. In addition, the plants *Juncus inflexus* and *Carex acutiformis* could be arranged in succession and/or the *Juncus inflexus* and *Carex acutiformis* could be mixed with each other.

For purification of industrial wastewater in a likewise preferred embodiment of another sewage treatment system in accordance with the invention the sequence of different plants species is as follows: (a) *Carex riparia*, (b) *Carex elata*, (c) *Carex rostrata*, (d) *Iris pseudacorus*, (e) *Juncus inflexus*, (f) *Scirpus lacustris*, (g) *Iris pseudacorus* and optionally (h) F2. Here the plants of species (b) *Carex elata* and (c) *Carex rostrata* can be mixed with each other. The plant species (f) *Scirpus lacustris* and (g) *Iris pseudacorus* can also be mixed with each other. Plants of species *Carex acutiformis* can additionally be mixed into the plants of species (d) *Iris pseudacorus*, preferably in 1:4 ratio by numbers.

The plants of the said different plant species could be arranged in a single plant container, and optionally, be spaced from each other in the direction of flow or across from the direction of flow of the wastewater. In other words, separate arrangement of the plants of different plant species, each in one plant basin, is not absolutely necessary to achieve a certain purification effect.

Another sewage treatment system in accordance with the invention could be designed for a volume flow of about 1.2 m3 wastewater per hour can be realized as follows:

the plant container has—comparable to that shown in FIG. 5 of DE 10 2004 023 170.2—at least six plant basins, where each of the plant basins has a surface area of 15 m2. The individual plant basins are arranged in succession with respect to the direction of flow of the wastewater being treated and they have the following plant populations:

| Basin 1: | *Carex riparia* |
|---|---|
| Basin 2: | *Carex riparia* |
| Basin 3: | *Carex elata/Carex rostrata* |
| Basin 4: | *Iris pseudacorus* |
| Basin 5: | *Juncus inflexus* |
| Basin 6: | *Scirpus lacustris/Iris pseudacorus* |
| Optional: | |
| Basin 7: | F2 |

Basically the structure of this sewage treatment system is comparable to FIG. 5 from the German patent application with the official file number DE 10 2004 023 170.2, although the various rows of plants are now formed in accordance with the above list.

The core of this specific sewage treatment system is *Carex riparia*. It is the main performer.

Building on the good properties of *Carex riparia*, a combined row of *Carex elata* and *Carex rostrata* are incorporated into the facility. *Carex elata* is a good oxygenating *Carex* species (3.64 to 3.71 mg/L), which can be combined with a less oxygenating *Carex rostrata* (3.19 to 2.57 mg/L). The combination of plants is sufficient to maintain an oxygen saturation level of 30 to 50% in the facility. *Carex elata* is additionally capable of surviving massive impact accidents and also exhibiting degradation performance.

If permeate-containing water is used, it is known that *Carex elata* is no longer capable of degrading the accumulating carbon compounds, but it converts them to readily degradable carbon compounds, so that they can be degraded by subsequent rows of plants or even within a row of plants. Because of this property of converting poorly degradable hydrocarbon compounds, *Carex elata* is put in the third basin.

Tests showed that the combination row has an efficiency of 12.3% (in the daytime) in COD reduction and efficiency of 8.2% for H18. Thus, for purification of wastewater with about 15 mg/L COD, about 0.4 mg/L H18 soil load can be purified without problem. The combination row, however, is not suitable in nighttime operation. In addition, continuous phosphate elimination of 4.3% is also observed in daytime operation. In nighttime operation an efficiency that is reduced by 1.6% is observed.

The fourth plant row is populated with *Carex acutiformis* and *Iris pseudacorus*, specifically with the plants essentially in the ratio *Iris pseudacorus:Carex acutiformis*=1:4.

In this combination row a very good oxygenating plant, *Iris pseudacorus* (4.88 mg/L to 6.06 mg/L) is combined with a very poor oxygenating plant, *Carex acutiformis* (3.03 to 2.52 mg/L).

In winter operation especially this combination row does not show any performance with respect to lowering the COD or H18 content in the wastewater. Thus, in a new or improved facility only the *Iris pseudacorus* should still be used since based on collected data it shows good values.

*Juncus inflexus* and the clubrush (*Scirpus lacustris*) are used in each of the two additional plant rows. According to the literature, the clubrush should have good properties in the area of phosphate elimination. As a very good oxygenator (5.6 to 6.4 mg/L), *Juncus inflexus* has excellent degradation effects in the area of hydrocarbon compounds. Phosphate elimination is already observed in young plants.

Phosphate elimination can be a sign above all to *Carex elata* and *Juncus inflexus* and *Scirpus lacustris*. An increase of phosphate elimination is observed in nighttime operation. Thus, phosphate-containing wastewater could be sent to an appropriate plant basin in the daytime or in the evening and left there overnight, since phosphate degradation is higher at night than in the day. The efficiency in the range of phosphate elimination is 1.1% in the daytime and 5.9% at night.

In addition, the two plant rows in Basins 6 and 7 are capable of reducing the COD content of the wastewater stream in the daytime.

Thus, besides *Carex riparia*, *Carex elata* turned out to be another preferred plant that should be used in every facility.

For purification of sanitary and industrial wastewater in another preferred embodiment of a sewage treatment system in accordance with the invention the sequence of different plant species is as follows: (a) *Phragmitis australis*, (b) *Juncus inflexus*, (c) *Carex riparia*, (d) *Carex elata*, (e) *Carex rostrata*, (f) *Iris pseudacorus*, (g) *Scirpus lacustris*, (h) F2, and optionally (i) *Scirpus lacustris*. The plants of species (d) *Carex elata* and (e) *Carex rostrata* could be mixed with each other.

As already pointed out above, preferably plants of just one plant species are arranged in a given plant basin. It can also be useful to arrange plants of at least two different plant species with each other in one plant basin. Through the arrangement of different plant species separately each in one basin it is possible in particular to prevent mixing of the plants of the different species with each other (wild growth) over time, the process reliability of the sewage treatment system with respect to clarification of the wastewater is also insured in the long run.

Various embodiments of sewage treatment systems in accordance with the invention in which at least six plant basins are provided, each of which contains plants with at least one plant species, were described above. Preferably the plants arranged in one plant basin are plants of one plant species. In other words the plants arranged in the individual plant basins differ with regard to plant species.

An especially flexible sewage treatment system can be realized if the flow direction of the wastewater being treated can be varied with respect to the sequence of plants of different species. This could take place, for example, by sending the wastewater being treated, after it has passed through one plant basin, to a plant basin different from the next one in the spatial arrangement that corresponds to the preset plant sequence. This could take place, for example, with the help of connecting pipes or a pipe system with which the wastewater being treated that has passed through one plant basin is transferred to a different plant basin, for example, conveyed by means of a pump, that is not arranged immediately next to the prior plant basin. For specific realization of such a delivery system for the wastewater being treated a control apparatus could be provided, for example, in the form of a computer, with which pumps, valves and/or gates can be actuated.

In an especially preferred embodiment a means with which the of the water that is to be treated can be optimized at least with respect to one preset parameter is provided in at least one plant container and/or one additional container of the sewage treatment system. A preset parameter could, in this case, be an amount of a certain pollutant, chemical element, chemical compound, microbes, bacteria and/or pathogens determined with respect to a volume unit of the wastewater being treated. This parameter could also be a property of the purified wastewater, for example, the property that the purified water exhibits drinking water quality. In the end this implicitly means an amount of certain components in water that defines an upper tolerable limit.

The means could exhibit filters (preferably living) or filter areas whose filter effect is based on the use of plants and/or single cellular and/or multicellular animals and/or bacteria.

For example, at least one algae ball, particular *Cladophora aegagropila*, could be provided. The algae ball or balls could be arranged in a plant basin and/or in an additional basin of the treatment facility. The algae ball is a freshwater alga. It has the property that it can degrade nitrite and nitrate from the water and can reduce pathogenic microbes in the water. Thus, for purification of sanitary wastewater, at least one algae ball can be arranged in a basin or plant basin of the sewage treatment system.

Alternatively, or in addition, at least one fern plant and/or at least one natural sponge could be provided. At least one plant of a fern plant and/or a natural sponge could be arranged in a plant basin of the sewage treatment system. Fern plants can remove toxic substances such as arsenic from the water.

Preferably the means have microbes and/or cyanobacteria that could be cultured or arranged on plants of the treatment facility, especially in their root area. The microbes therefore, also bacteria, are capable of converting N2 (nitrogen) from the air to ammonia (NH3). Ammonia is a prerequisite for plant growth, which is desirable in particular in sewage treatment systems at high altitudes (for example, >2000 m above sea level). The microbes could be specially populated at the roots of the plants or on specially provided substrates (for example, lava rock), which could be permanently positioned in a plant container or in at least one basin. Alternatively or additionally carbon dioxide (CO2) can be blown through the wastewater that is to be treated. The carbon dioxide could be dissolved, for example, in ambient air, or could derive from chemical reactions that take place in the room or in the building (for example, from a chimney). The plants are stimulated to grow by the introduction of carbon dioxide. With cyanobacteria pure oxygen (O2) can be produced with the photosynthesis process. Pollutants present in the water can combine with the pure oxygen, so that through this the plants have the capability of absorbing or degrading pollutants. This is especially advantageous for the accumulation of pollutants in colloidal form, for example at plant roots.

Alternatively or in addition the means could have artificially made filters.

At least one filter that contains loam and/or tea leaves and/or coffee grounds and/or rice hulls is provided in at least one plant container and/or one additional container. The filter could be prepared as described below:

dry, crushed loam is mixed with organic materials like tea leaves, coffee grounds and/or rice hulls and a little water to form a solid mass, an essentially cylindrical pot, which can be closed at one end, is molded from this mass, this mold is dried, for example, in the sun, and then hardened, for example, fired in an oven at a specified temperature, the filter is surrounded with straw and placed on a pile of cow dung.

After an hour the filter is ready to use, it can remove 96.4 to 99.8% of Coli bacteria. The concentration of microbes that can still be detected after that clearly varies in a range that is safe for humans. It is conceivable that the filter be arranged in the sewage treatment system so that all of the water must pass through the filter or flow by it.

In addition, a filter that contains seeds, preferably ground, of a fruit of a tree, especially the tree *Moringa oleifera*, could be used. Such a filter could be formed, for example, in the form of pressed pieces, for example, ones the size of a hockey puck, and could be placed in a plant basin and/or an additional basin. Optionally such a pressed piece can dissolve over time and form compounds with pollutants and/or kill bacteria. For this reason one should ensure that additional pressed pieces are added to the sewage treatment system punctually. The moringa tree grows in Africa, Madagascar, Arabia and India. It is a deciduous tree and grows up to 3 m high. The fruits of the tree are pods of a green color in which the seeds are situated. These seeds have the property that they can clean cloudy water. One tree produces about 5000 seeds per year. One seed grain at 100 mg/L is sufficient to kill 99% of the bacteria therein. This means if roughly 400 to 700 mg (1.5 seeds) is stirred into 1 L, germs will no longer be detected. Ground seeds contain a protein that produces a positive charge and binds negatively charged particles such as loam, bacteria and other toxic particles in wastewater. The flocculation process develops when the proteins bind negatively charged particles into flakes formed through the aggregation of the particles in the wastewater. The flakes can be removed by settling or filtration, for example. It is conceivable for the seeds to be arranged in a filter in the sewage treatment system so that all the water must pass through the filter.

In a preferred embodiment at least one filter is provided at the bottom of a plant container and/or a plant basin and/or another basin. The filter material of such a filter could consist of, for example, ground seeds of the fruit of the *Moringa oleifera* tree. The filter material could be arranged between the bottom of the container or basin and a filter mat. The filter mat is designed to be at least partially permeable for the wastewater that is to be purified, in the sense of a filter membrane, so that an interaction is possible between the filter material and the wastewater that is to be cleaned, which in the end, causes a cleaning of the wastewater.

Especially preferably, at least one flow guide means is provided, with which a flow of the wastewater in the horizontal and/or vertical direction can be reduced through a plant container and/or plant basin. For example, a flow guide means can have at least two plates arranged side by side and/or one after the other, preferably obliquely. The plates in particular enable, at least to a large degree, purification of the wastewater in the sense of an inclined clarification principle, for example, by directing the water to be purified in the direction of a filter arranged on the bottom of the basin. At least one plate could be designed to be at least partially purified for the wastewater being cleaned, so that a part of the wastewater being cleaned can also pass through the plate without being diverted from the plate in the intended direction of the flow through it. The degree of permeability of the plate is a parameter that can be specially matched to the specific filter arrangement that is present or to the purpose that is to be achieved.

In addition, a flow guide means could have at least two plates arranged side by side and/or one after the other, preferably essentially vertically, especially in each case in the sense of a weir, which could be arranged to project alternatingly from above down under the water surface and from the bottom of the basin upward in the direction of the water surface and optionally up to above the water surface. Through this the water to be purified can be guided alternatingly in the horizontal and vertical direction through the basin. Flow guide means of this kinds could be used in particular when filter material dissolved in the basin with wastewater, which floats in the wastewater near the water surface, is provided, so that the wastewater, as it flows through and around these flow guide means is passed at least once through a layer with the floating filter material.

In particular when the wastewater is intended to have drinking water quality at the end of the clarification process, it is specified that the wastewater be heated for a preset time with at least one heating agent. In general, it should be sufficient to heat the water to at least 50 to 60 degrees Celsius for a period of at least one hour. Pathogens can especially be destroyed by this.

The heating means could have at least one flow-through heater through which the wastewater can be passed. A flow-through heater in the present sense is understood to mean in particular a device in which the wastewater or a heat exchange medium is passed and with which the wastewater or heat exchange medium is directly heated, for example, by the gas flame of a gas burner or by heat exchange with a hotter medium. The amount of flow and/or the flow rate of the wastewater here should be settable and/or controllable, specifically in order to heat the water at a specified minimum temperature for a specified minimum time.

Specifically, the heating means could have at least one heat circulation loop or a heat pump. Such a heat circulation loop should have at least connecting lines, at least a flow-through heater, at least a heat exchanger arranged in a plant basin or other basin and a heat exchange medium. The heat exchange medium is heated in the flow-through heater and passed through the connecting lines to the heat exchanger in order to heat the wastewater. The heat exchange medium could be a liquid or a gas and be circulated through the heat circuit with a pump.

In an especially preferred embodiment the flow-through heater has a solar connector or is connected to a machine in the building that in its operation releases heat energy to the heat exchange medium circulating through the flow-through heater. Through these measures heating of the wastewater can be cheaply realized in an especially advantageous way, since in this case electric power will not have to be drawn from a power grid to heat the water, nor will gas or oil have to be burned. A flow-through heater is especially designed in the form of a solar collector if the sewage treatment system in accordance with the invention is operated in an area with a great deal of sunshine. To optimize the efficiency of the solar collector, at least one device for optically concentrating sunlight could be provided, for example, mirrors or lenses, especially Fresnel lenses.

It is also conceivable to heat the wastewater by the principle of an immersion heater, where the electric current to heat an electrical resistant could be generated by photovoltaic plant, preferably the solar cells or photo element. Also, at least one device for optically concentrating sunlight could be assigned to the solar cells or the photo elements. Likewise to increase the efficiency of the generation of heat or current a solar collector and/or a portion of the photovoltaic plant could be situated so that it is aligned to the current special position [sic; position of the sun].

The electrical current generated with the photovoltaic plant could also be used to operate other components of the sewage treatment system. For example, possible users could be electrically operated water pumps. Preferably, the electrical current generated with the photovoltaic plant is stored in at least one battery, so that an electrical supply for the corresponding components of the sewage treatment system is guaranteed at night or during unfavorable weather.

The wastewater could be heated in a basin or buffer basin, which can be provided in the direction of flow of the wastewater at the beginning and/or at the end of the sewage treatment system. In this way not all of the plants arranged in the plant basins are supplied directly with the heated water.

In addition, it could be provided that at the end of the heating step the heat energy supplied to the wastewater is used at least partially to heat the building, for example, with the help of a heat pump provided for this. Through this the heating process of the wastewater could be drawn into the overall concept of climatization and the energy balance of the building on which the sewage treatment system is situated.

In another embodiment the wastewater is at least partially purified electrolytically. For this, uninsulated electrical conductors through which an electric current can be passed could be provided in a plant container or other container. This current could flow through the wastewater to a polished surface correspondingly provided in the plant basin or plant container. Usually the wastewater has sufficient salts, heavy metals, mineral fractions or ions for electrical conductivity of the wastewater to be guaranteed. Both direct current and alternating current could be used. Preferably high voltage, for example, 10,000 to 20,000 V, and low current are used.

Disease pathogens in the wastewater could also be at least partially eradicated by hitting them with high energy radiation. This can take place, for example, with light in the ultraviolet wavelength spectrum. For example, the ultraviolet light of the sun can be used as a light source and/or at least one UV lamp that generates ultraviolet light can be used. Preferably the wastewater is passed through a shallow basin with relatively large water surface area, since high energy radiation cannot penetrate deeply into water and the wastewater should be penetrated at least most of the way through by the high energy radiation.

In addition, at least one paper filter, which could consist of ground or recycled waste paper or paper, could be provided for filtering the wastewater. It is also conceivable to provide a filter or a filter area with finely chopped green matter, for example, from grass, with which the wastewater can be at least partially purified.

Apart from a filter material such as finely chopped green matter, which could be introduced in a specific region dissolved in the wastewater, the means for optimizing the degree of purification of the wastewater with at least regard to one presettable parameter, are arranged in a specified site or permanently in the sewage treatment system.

In an especially preferred embodiment, the residence time of the wastewater in a plant container and/or in another container and/or in a basin is specifiable so that a nearly optimum clarification effect can be achieved. This could be achieved by a central control or regulation device for controlling the sewage treatment system in accordance with the invention, for example, in the form of a computer, which appropriately controls the individual pumps, valves and/or gates so that the wastewater remains in a plant basin with plants of species *Carex riparia* for at least 3 h or is passed through said plant basin over a period of 3 h.

In an especially preferred embodiment of this invention a device is provided for introducing oxygen into the wastewater. This device has a wastewater feed, which in the simplest case could be realized as a tube. The wastewater supplied from the wastewater feed falls in free fall onto an impact lattice, through which the wastewater can break up into droplets. An impact lattice can be imagined as a number of fins or sheets arranged transversely or obliquely to the direction of the fall. These could be designed in the form of metal strips or like a washboard.

In the end an impact lattice is understood to mean anything that enables the formation of droplets by the wastewater falling on the impact lattice. The device could have a housing, which at least for the most part, surrounds the impact lattice. The housing could have an opening or an open area through which ambient air can reach the impact lattice, so that oxygen from the ambient air can be carried into the wastewater. The wastewater that has passed through the device, now with an elevated oxygen content, can be further processed in the sewage treatment system.

With regard to a method for purification of wastewater, the task mentioned at the start is solved by the characteristics of Claim 1. Accordingly, the method in accordance with the invention concerns a method for purification of wastewater with a sewage treatment system. The sewage treatment system consists of a plant container, a feed unit, a discharge unit and plants. The wastewater that is to be treated is fed to the sewage treatment system with the feed unit. Purified wastewater is discharged from the sewage treatment system with the discharge unit. The plants are arranged in the plant container and developed so that they are arranged in the plant container without substrate. A plant container preferably has at least two plant basins. At least one other container can be provided. At least a part of the plant container is arranged on the roof of a building. Plants of at least two different plant species are provided in the plant container. Depending on the type of wastewater, for example, industrial and/or sanitary wastewater, the wastewater is purified in a specifiable sequence of plants of different plant species.

The method in accordance with the invention for purifying wastewater can be carried out in particular with a sewage treatment system as in one of Claims 1-20, so that reference is made [to these Claims] in order to avoid repetition of the preceding part of the description.

Moreover, it should be expressly pointed out that the sewage treatment system in accordance with the invention also operates at night, thus the plants have nighttime activity without light. A sewage treatment system on the roof is further advantageous in the case of a fire, since the water there can serve as fire protection. With the sewage treatment system in accordance with the invention the wastewater can be reduced by about 50%, which is first of all brought about by water evaporation in the sewage treatment system. With a sewage treatment system in accordance with the invention oxygen is produced in an especially advantageous way. To the extent that this can be used for emissions trading, since an industrial operation with a sewage treatment system in accordance with the invention can emit more $CO_2$, since the sewage treatment system produces oxygen, which can be counted against the higher $CO_2$ emission. Of course, the sewage treatment system in accordance with the invention first of all serves to purify or reduce wastewater so that it represents a possibility of satisfying the conditions prescribed in the Federal Emissions Protection Law, particularly with regard to the fly ash problem, sewage treatment systems arranged on roofs can represent an approach to the solution, since the fly ash can settle on the water surface there and thus is permanently held and likewise can be purified or degraded by the sewage treatment system.

In an especially advantageous way, a reduction of costs of industrial and/or sanitary wastewater can take place through the sewage treatment system in accordance with the invention, since high costs for a special industrial decontamination of the wastewater can be saved. A sewage treatment system in accordance with the invention can be designed so that it is capable of using purified water in drinking water quality. This can be used with special advantage in particular in regions in which drinking water is in short supply or in which a supply of drinking water does not take place directly via pipelines (for example, remote farms). However, even in built-up areas in which this is not the case, it can considerably reduce the costs of drinking water supplied. Even the problem of using surface area to create natural areas (green areas) can be solved by this.

Usually the plants of a sewage treatment system will operate at least 20 years, so that after an initial investment, in particular with regard to the purchase of the plants, the costs of such a facility should be very rapidly amortized. As a rule, there will also not be any roof repairs, since the roof will not be exposed to weather, for example, sun, hail or snow, because of the sewage treatment system on it. The fact that green plants are arranged on the roof of the building gives people, especially the workers of an industrial concern, a positive environment and helps promote a sense of well being.

BRIEF DESCRIPTION OF THE DRAWINGS

FIGS. 6-9 are side views of other parts of an embodiment of a sewage treatment system in accordance with the invention; and FIG. 10 is a perspective view of a device for introducing oxygen into the wastewater that is to be treated.

DESCRIPTION OF THE PREFERRED EMBODIMENT

Figure 1:
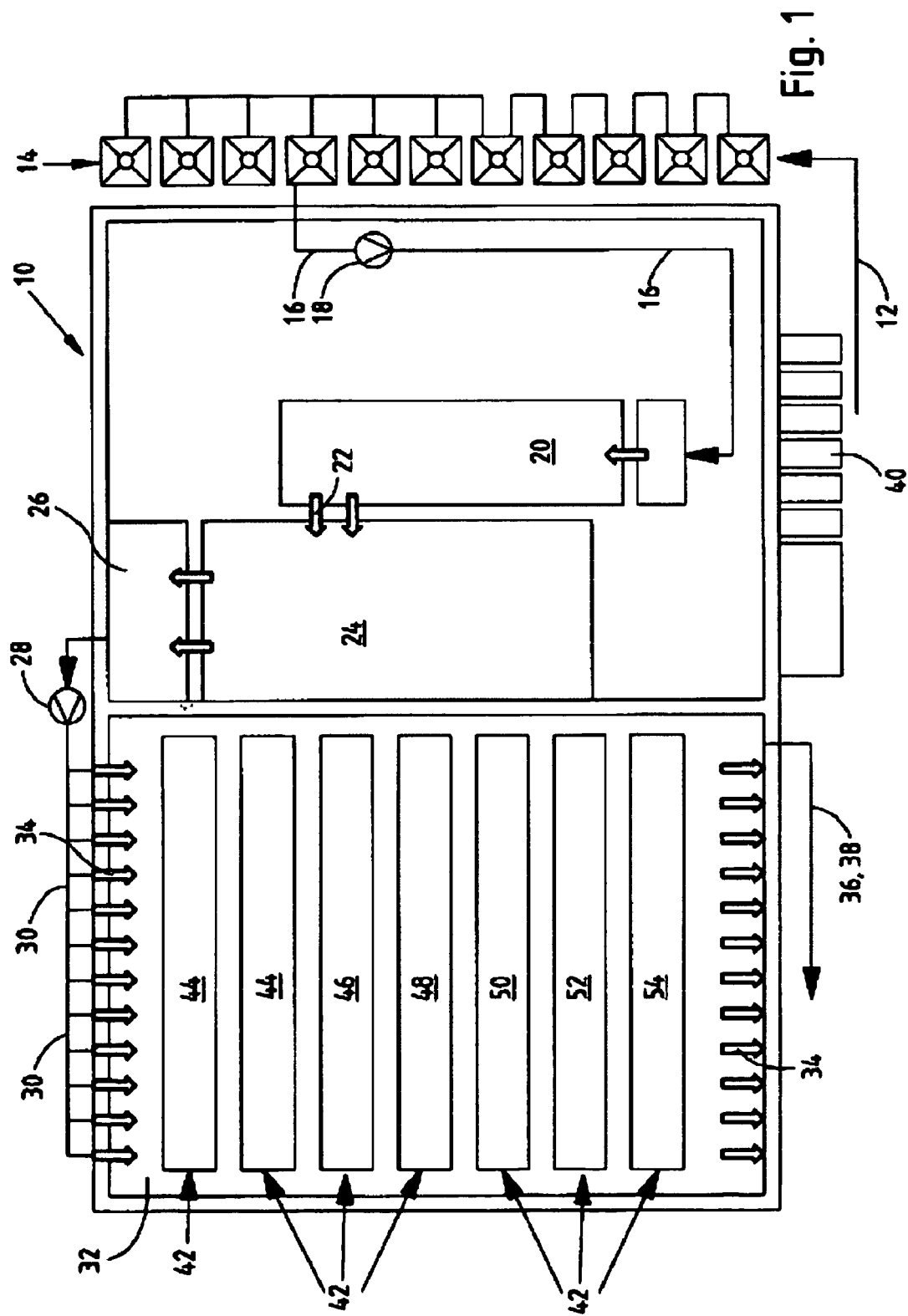
FIG. 1 is a plan view of a first embodiment example of a sewage treatment system in accordance with the invention.

Like or similar structural groups in the figures are indicated with the same reference numbers. FIG. 1 shows a sewage treatment system 10 in accordance with the invention in plan view for a flat roof in an industrial application, i.e., for purification of industrial wastewater. The wastewater to be purified is supplied to the sewage treatment system 10 via the supply connection, which is only shown schematically by arrow 12. The wastewater is sent for sedimentation in several ground level decanters 14. The wastewater is pumped or sent to preliminary clarification tank 20 by means of pump 18 via line 16, which is assigned to the feed unit of the sewage treatment system 10. The wastewater falls over the waterfall 22, which is only schematically indicated, and is in free fall over a path of a few cm and falls into intermediate storage tank 24. The intermediate storage tank 24 is optional here and serves to balance out water surges, i.e., unexpectedly high amounts of water in an interval of time. In other words, the intermediate storage tank 24 is a retention tank or an additional tank. The water flows from there into an intermediate basin 26, from which it is pumped by means of pump 28 via lines 30 to plant container 32. The wastewater conducted into plant container 32 flows in the direction of arrows 34 into plant container 32 and is conducted via lines 36 to the discharge 38, which is only shown schematically. At this point it should be emphasized that a part of the wastewater sent to the sewage treatment system 10 can also evaporate in basins 20, 24 and 32. The basins 20, 24 and 32 that are on the building roof are accessible via steps 40.

In the plant container 32 there are several areas 42 with plants. Plants of different species are arranged in the areas 42. In the first two areas, 42, which are indicated by reference number 44, there are plants of species *Carex riparia*. In area 42 indicated by reference number 46, there are several rows of plants of two plant species, namely *Carex elata* and *Carex rostrata*. In area 42 indicated by reference number 48 there are plants of species *Iris pseudacorus*. In area 42 indicated by reference number 50 there are plants of species *Juncus inflexus*. In area 42 indicated by reference number 52 there are several rows of plants of two species, namely *Scirpus lacustris* and *Iris pseudacorus*. The area 42 that is indicated by reference number 54 contains plants of species F2 and is not absolutely necessary. Thus, the plants arranged in areas 44 to 54 are all arranged in one plant container 32. Accordingly, in this embodiment example there are no separating walls provided between the individual areas 44 to 54 or the plant container 32 is not divided into individual plant containers. The entire plant container 32 has a slight slope on the roof, so that the wastewater sent to plant container 32 via lines 30, over nearly the entire width of the plant container 32, flows in the direction of flow 34 toward discharge 38 due to gravity. The sequence or succession of the plants of the different species in areas 44 to 54 with respect to the direction of flow 34 is arranged to enable optimum purification of industrial wastewater.

Figure 2:
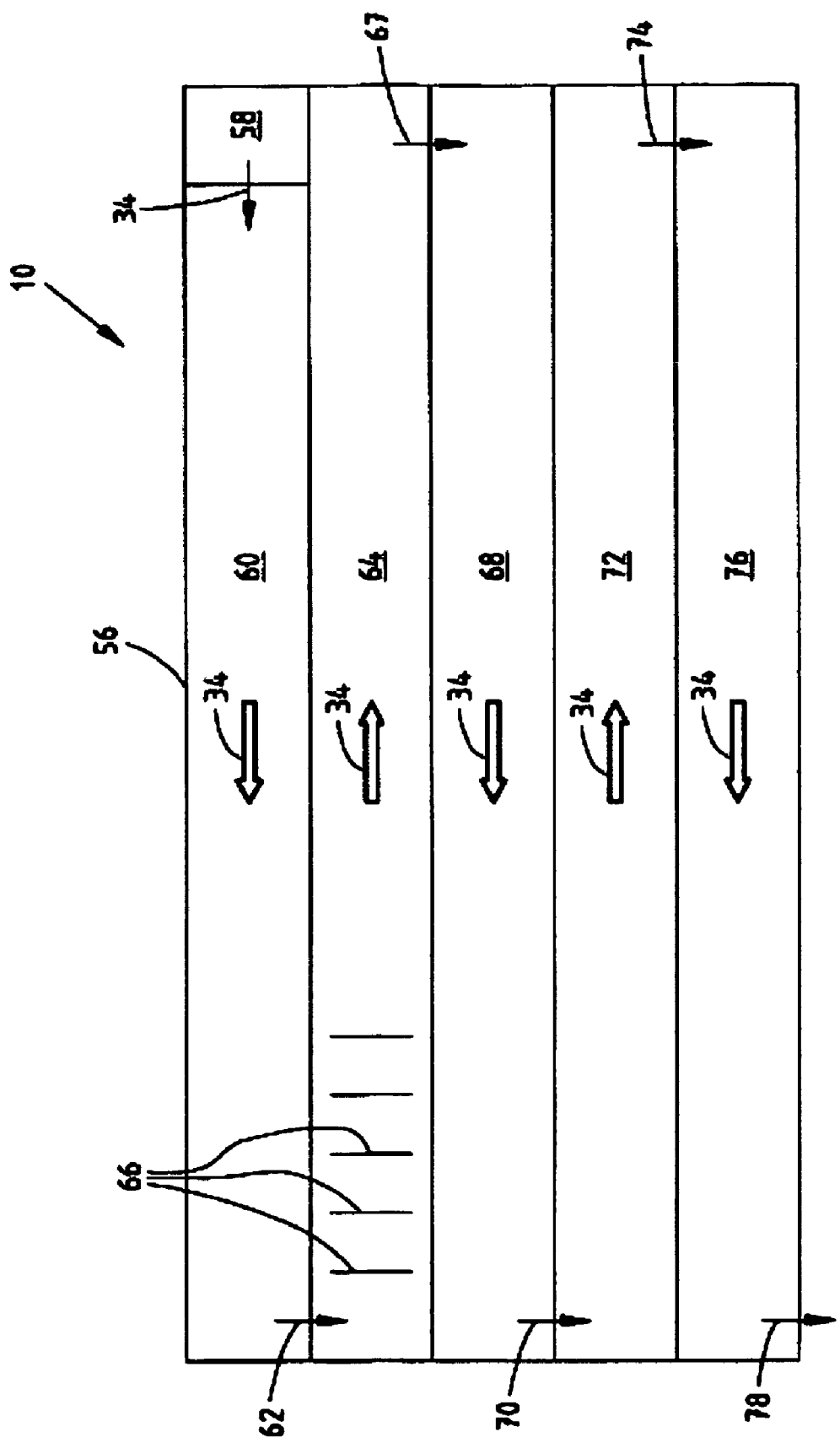
FIG. 2 is a plan view of a second embodiment example of a sewage treatment system in accordance with the invention.

FIG. 2 shows, in a schematic representation, a plan view of a second embodiment example of a sewage treatment system 10 in accordance with the invention. This sewage treatment system is especially designed for purification of sanitary wastewater. Here the plant containers are indicated by reference number 56. There are several plant basins provided in plant container 56 and these are populated with plants of different species. The wastewater to be purified is sent initially into a feeder tank 58 via a feed unit not shown in FIG. 2. From there the wastewater goes in flow direction 34 to the plant basin 60, in which there are plants of species *Juncus inflexus* arranged. The water passes through the plant basin 60 from right to left. At the left end of plant basin 60 there is a crossover line 62, only shown schematically by means of an arrow, by which the wastewater goes to plant basin 64. Plant basin 64 contains plants of two different species, *Carex acutiformis* and *Iris pseudacorus*. Here the plants are arranged in separate rows, only shown schematically by reference number 66, across the direction of flow 34 and alternating with each other in succession. The direction of flow of the wastewater in plant basin 64 is from left to right. At the right end of plant basin 64 is another crossover line 67, through which the wastewater flows into plant basin 68, which contains plants of species F2. The wastewater flows from the right end of plant basin 68 to the left end to crossover line 70, where it flows into the next plant basin 72. Plant basin 72 contains plants of species *Carex elata*. After the wastewater flows from left to right through plant basin 72 it goes through crossover line 74 to plant basin 76, in which there are plants of species *Iris pseudacorus* and *Scirpus lacustris* in individual rows across the direction of flow 34 and alternating in succession with each other, comparable to the arrangement of plant rows 66 in plant basin 64. After the wastewater has passed through plant basin 76 it is discharged from the sewage treatment system 10 by the discharge unit 78, which is only schematically indicated.

Figure 3:
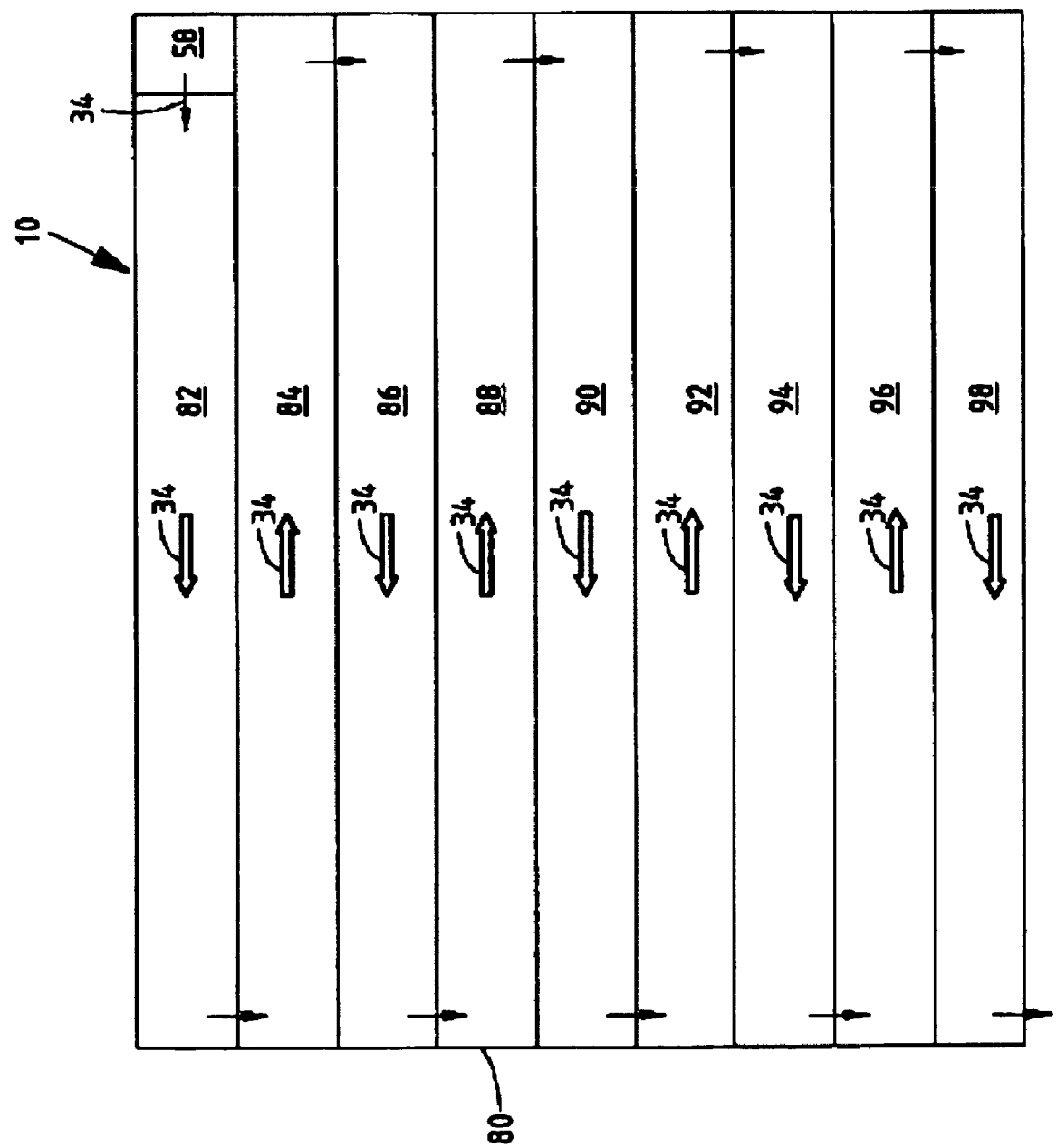
FIG. 3 is a plan view of a third embodiment example of a sewage treatment system in accordance with the invention.

FIG. 3 shows, in a schematic representation, another embodiment example of a sewage treatment system 10 in plan view, which is especially aimed at purification of industrial and sanitary wastewater. Here, too, there are again several plant basins provided in one plant container 80. The direction of flow of the water is comparable in the state of operation of the sewage treatment system shown in FIG. 3 to the direction of flow as shown in FIG. 2. In other words, the wastewater weaves or meanders in the horizontal direction through the sewage treatment system 10 shown in FIG. 2. The wastewater passes from filling tank 58 into the first plant container 82, which as a pre-purification basin is populated with plants of species *Phragmitis australis*. Plants of species *Phragmits australis* are also provided in plant basin 84. This plant basin 84 simultaneously serves as a holding basin. The plant basins 86 through 98 are populated with plants of the following species:

| Plant basin 86: | *Juncus inflexus*, |
|---|---|
| Plant basin 88: | *Carex riparia*, |
| Plant basin 90 and 92: | *Carex elata* and *Carex rostrata* in individual rows across the flow direction 34 alternating with each other (similar to row 66 in plant basin 64), |
| Plant basin 94: | *Iris pseudacorus* |
| Plant basin 96: | *Scirpus lacustris*, and |
| Plant basin 98: | *Scirpus lacustris* and F2 in individual rows across the flow direction 34 alternating with each other. |

Figure 4:
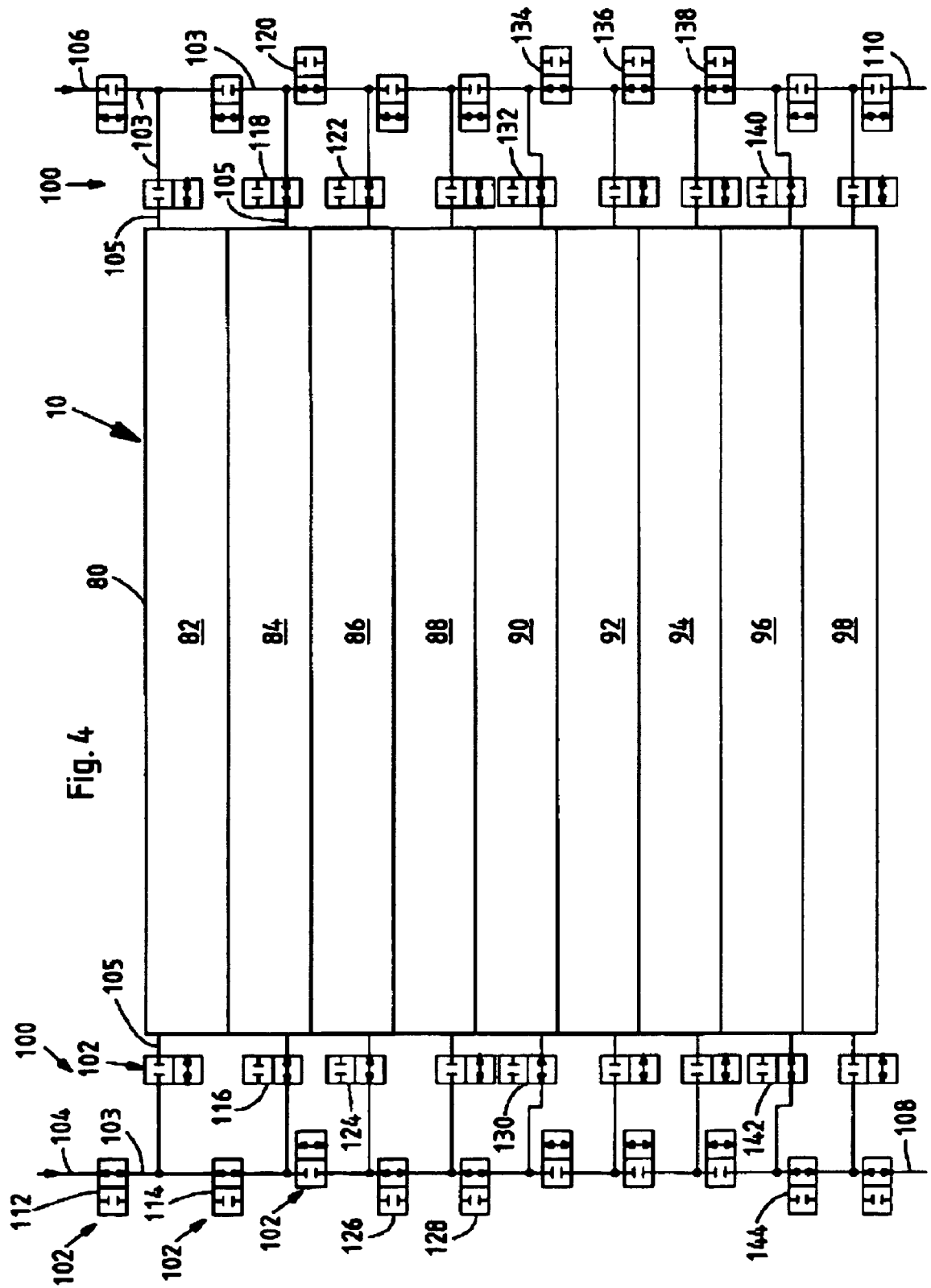
FIG. 4 is a plan view of a fourth embodiment example of a sewage treatment system in accordance with the invention.

FIG. 4 shows a sewage treatment system 10 that is similarly designed to sewage treatment system 10 from FIG. 3. In particular, the individual plant basins 82 to 98 are essentially populated with the same plants as in the sewage treatment system 10 in FIGS. 3 and 4. The sewage treatment system 10 shown in FIG. 4, however, can also be flexibly operated in the sense that wastewater of a different kind can also be purified with it. This is possible because in this sewage treatment system 10 there is a device 100 for varying the sequence in which the water passes through the individual plant basins 82 to 98. The device 100 consists of a number of 2/2-way valves 102, which have a barrier position and a through position. For a simpler presentation only some of the 2/2-way valves 102 on the left side of the FIG. 4 are given a reference number. In addition, there are connecting lines 103 in the form of pipes that connect the individual 2/2-way valves 102 with each other. Connecting lines 105 with which the 2/2-way valves are connected to the individual plant basins 82 to 98 are provided. In device 100 pumps, not shown, with which the wastewater can be pumped from one plant basin to another are provided.

In the sewage treatment system 10 in accordance with the invention that is shown in FIG. 4 it is basically possible to send the wastewater via feed line 104 to the left side or via feed line 106 to the right side of the sewage treatment system 10. Accordingly, it is also possible to send the at least partially purified wastewater via discharge line 108 to the left side or via discharge line 110 to the right side of the sewage treatment system 10. This is dependent only on the relevant position of the corresponding 2/2-way valve 102.

In the operation state shown in FIG. 4 the valve positions of the 2/2-way valves 102 are chosen so that the wastewater is sent via feed line 104 first into plant basin 84. For this the 2/2-way valves 112, 114 and 116 are set with their direction of flow in the active position. In addition, the 2/2-way valves with the reference numbers 118 to 144 are all set to through flow, so that the wastewater, after crossing plant basin 84 next flows through plant basin 86 then plant basin 90, and finally plant basin 96. In this operating state of sewage treatment system 10 from FIG. 4 the plant basins 82, 88, 92, 94 and 98 are not supplied with wastewater that is to be treated or are not used for purification of this wastewater. Of course, it is possible by the appropriate actuation of 2/2-way valve 102 to represent nearly any flow sequence for the wastewater that is to be treated, so that the sewage treatment system shown in FIG. 4 is flexibly adjustable to different kinds of wastewater. With the configuration of connecting lines 103 and 105 shown in FIG. 4 not any sequence of flows of the wastewater through the plant basins 82 to 98 can be produced. However, other additional connecting lines, not shown in FIG. 4, could be provided, with which, for example, a direct connecting line between plant basin 92 and plant basin 84 could be made, via which the wastewater sent to basin 84 can be sent directly to plant basin 92, if, because of the valve settings of the 2/2-way valves 102, direct drainage from plant basin 84 is no longer possible.

Figure 5:
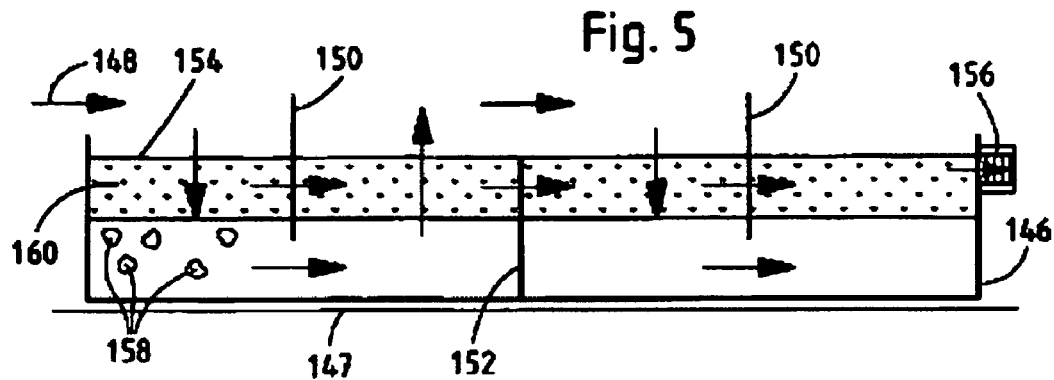
FIG. 5 is a side view of a part of an embodiment of a sewage treatment system in accordance with the invention.

FIG. 5 shows a side view of a plant basin 146, which is a part of a sewage treatment system in accordance with the invention. The plant basin 146 is arranged on a roof 147, which is indicated only schematically and partly. It is only schematically indicated that the waste water is guided from the left in the direction of arrow 148 into the plant basin 146. In plant basin 146 there are partially permeable plates 150 and 152, which are arranged essentially in a vertical position and extend over the entire width of plant basin 146, perpendicular to the plane of the drawing. A small portion of the wastewater can pass through pores, not shown in FIG. 5, in plates 150 and 152. The first plate 150 in the direction of arrow 148 extends from above the surface 154 of the wastewater in plant basin 146 to below the surface. Plate 152 extends from the bottom of the plant basin 146 up to roughly the water surface 154 and is arranged here in the sense of a weir. The second plate 150, which is arranged to the right of the first plate 150, likewise extends from above the water surface 154 to below the water surface. Thus, the wastewater, after being introduced into plant basin 146 in the direction of arrow 148 is first moved in the horizontal direction until it reaches the first plate 150. From there, it must essentially flow downward in the vertical direction in order to flow further in the direction of arrow 148 under the first plate 150. Because of plate 152, it must flow vertically upward in order to flow over plate 152 in direction 148 further from left to right. At the second plate 150 on the right the wastewater initially flows essentially in the vertical direction downward and then again essentially in the vertical direction upward to exit plant basin 146 at the paper filter 156 arranged at the right edge of the plant basin. Finely chopped waste paper is used as filter medium in paper filter 156.

In addition, in plant basin 146 in the left hand lower region there are several algae balls 158 of species *Cladophora aegagropila*, which flow freely in the left hand part of the plant basin 146. In addition, in the upper region 160 of the wastewater being treated in plant basin 146 there are ground seeds of the fruit of the *Moringa oleifera* tree, with which bacteria are eradicated. The ground seeds are kept from the paper filter 156 at the outlet from the plant basin 146 by suitable mechanical filter means, not shown. The mechanical means could, for example, be a lattice with sufficiently small lattice spaces, which is designed or molded so that plugging does not arise as the water leaves plant basin 146. Mechanical filter means would, for example, not be necessary if the water discharged from plant basin 146 were arranged in a lower region of plant basin 146, under region 160.

Figure 6:
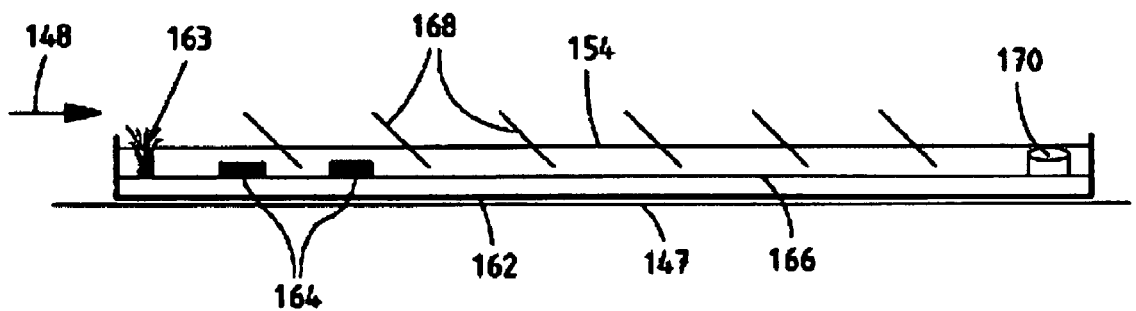

FIG. 6 shows a side view of another plant basin 162 in which wastewater is introduced on the left side, indicated by arrow 148. The plant basin 162 has a shallow water depth. In the left hand region of plant basin 162 there are fern plants 163 and pressed cakes 164 of ground seeds of the fruits of the *Moringa oleifera* tree. The pressed cakes 164 are comparable in size to a hockey puck. A filter mat 166 that is permeable for the wastewater is arranged between the water surface 154 and the bottom of plant basin 162. Between the filter mat 166 and the bottom of the plant basin 162 there are likewise ground seeds of the fruit of the *Moringa oleifera* tree. However, the filter mat 166 is not permeable for the seeds, so that a filter means is provided in stationary position over nearly the entire bottom region of plant basin 162. Plates 168 are arranged obliquely in succession across the basic direction of flow 148 of the wastewater in plant basin 162; these plates have low permeability for the wastewater. The plates 168 extend from above the water surface 154 downward, but not all the way to filter mat 166. The wastewater flowing through plant basin 162 is guided by plates 166 in the sense of a sloped clarification principle—in the direction of filter mat 166 or the bottom of plant basin 162, so that a very high interaction between the wastewater and the filter material between the filter mat 166 and the bottom of the plant basin 162 is guaranteed.

In the right hand region of plant basin 162 there are a number of synthetically-made filters 170 fixed in position (only one is shown for simplicity of representation), which contain, for example, loam, tea leaves, coffee grounds and rice hulls. Bacteria, disease pathogens and microbes in the wastewater can also be eradicated with these.

Figure 7:
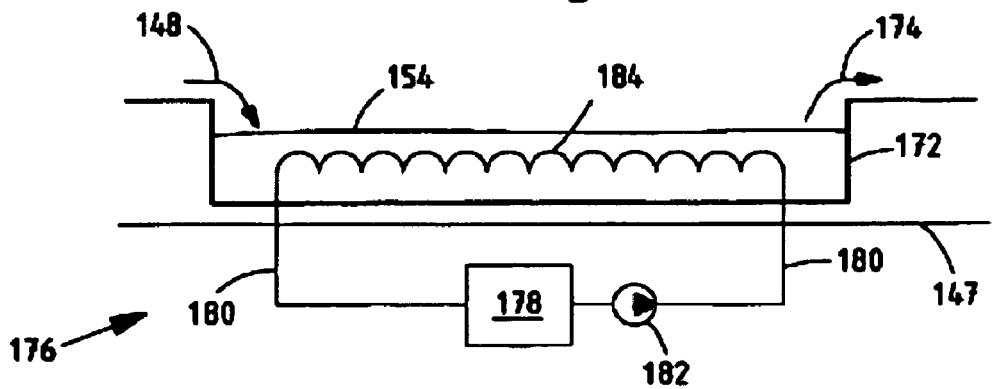

FIG. 7 shows, in a schematic side view, a basin 172, which represents a part of a sewage treatment system in accordance with the invention in which wastewater is introduced from the direction of arrow 148 and in which there are no plants. The wastewater that is to be purified is introduced into basin 172 and flows through basin 172 from left to right and, as is only schematically indicated, removed from basin 172 at the right hand side in direction 174. A heating means 176 having a heat circulation is arranged in basin 172. The heating means 176 has a flow-through heater 178 that is in the building, with which the heat exchange medium circulating in the heating loop via connecting lines 180 is heated. The heat exchange medium is pumped through the heating loop with pump 182. In basin 172 there is a heat exchanger 184 that is connected to the connecting lines 180 of the heating loop. The heat exchange medium pumped by pump 182 and heated by flow-through heater 178 is passed through the heat exchanger 184. Through this the wastewater is basin 172 is heated for at least one hour to a temperature of at least 60 degrees Celsius. In this way microbes and *legionella* in the wastewater can be eradicated.

FIG. 8 shows, in a side view, two basins 186 and 188, which represent a part of a sewage treatment system in accordance with the invention. Wastewater to be treated is first sent to basin 186, as indicated schematically by arrow 148. From there it is conveyed by pump 182 via the connection line 190 to a flow-through heater in the form of a solar collector 192. The wastewater flows through solar collector 192 and is sent into basin 188 via connecting line 194. The solar collector 192 and the water in it are heated by the sun 196, so that microbes and bacteria in the water can be eradicated.

FIG. 9 shows, in a schematic side view, a basin 197, which is a part of a sewage treatment system in accordance with the invention and is arranged on a roof 147. Here, too, the wastewater is transported from left into basin 197 and after it flows from left to right to the right side is removed from basin 197. In basin 197 there is an electric heating coil or an electrical resistance 198, which is electrically connected via conductors 204 to solar cell 200 of photovoltaic unit 202. The solar cell 200 converts radiation from the sun 196 into electrical current. The electrical current is sent via the electrical conduits 204 to the electrical device 206. The light rays from the sun 196 that would not otherwise strike the solar cell 200 are directed to solar cell 200 by mirrors 207. Both the solar cell 200 and mirrors 207 could be aimed at the relevant position of the sun 196, for example with motor-driven tilting devices, not shown. The electrical device 206 especially has a battery, in which the electrical energy generated by the solar cell 200 can be stored and with which individual components of the sewage treatment system can then be operated when the sun is not present. Electrical device 206 can additionally contain control and regulation units as well as voltage, current and frequency converters or changers. An electrical heating resistance 198 is connected to the electrical device 206 via electrical conductors 204, so that the water that is to be treated in basin 197 can be heated with the electrical heating resistance 198—by the immersion heater principle.

In addition, in basin 197, bare electrical conductors 208 are provided, which likewise are connected to electrical device 206 via electrical conductors 204. An electrical field is formed between the bare electrical conductors 208 and the polished surface 210 by the high voltage, low current electrical current that passes through the bare electrical conductors 208, the wastewater in basin 197 being electrolytically purified by said field.

FIG. 10 shows a device 212 for introducing oxygen into the wastewater that is to be purified. The device 212 could, for example, be arranged in a region close to the feed unit of a sewage treatment system in accordance with the invention in order to reduce oxygen into the wastewater at a point in the clarification or purification that is as early as possible. The device 212, however, could also be provided within a sewage treatment system, for example, after plants with low oxygenation in the direction of flow of the water. The device 212 has a wastewater feed 214, which is realized in this example as a tube. The wastewater sent by the wastewater tube 214 falls in free fall onto a baffle 216, so that the wastewater can break up into droplets. The baffle 216 has several plates arranged across and/or obliquely to the directional fall of the water and each in a specific case could be made of metal strips. The device 212 has a housing 220, which at least mostly surrounds the baffle 216. The housing 220 includes an open area 222, via which ambient air can get to the baffle, so that oxygen can be introduced from the ambient air into the wastewater. Under the open region 222, the housing 220 has a glass panel 224, so that the baffle 216 can be seen from outside, in order to easily be able to see contaminants or deposits on the baffle 216. With such a device, an oxygen saturation of at least 25% can be achieved at a relatively low volume flow of about 30 L/h. Higher volume flows (60 L/h and 100 L/h) bring about an oxygenation over 50% (namely, for example, 57 and 68%). After the wastewater leaves device 212 it passes through the gap 226 provided at the bottom of device 212 or housing 220 and leaves device 212 and is further processed in the sewage treatment system.

Finally, it should really particularly be pointed out that the above embodiment examples only serve to describe the claimed teaching, but do not limit it to the embodiment examples.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. A sewage treatment system for purifying wastewater, comprising:
   a plurality of plant containers, at least one of the plant container being arranged on a building roof;
   a feed unit for feeding wastewater to be purified to the sewage treatment system;
   a discharge unit for discharging purified water from the sewage treatment system; and
   plants, the plants being arranged in the plant containers without a substrate, and plants of at least two different plant species are provided in the plant containers, and where, depending on a type of the wastewater, the wastewater is purified in a specified sequence of plants of different plant species, and wherein the plants are situated at a specific site in the plant container and remain there on a bottom of the plant container.

2. The sewage treatment system of claim 1, wherein:
   the sewage treatment system includes plants of at least two of the following plant species: *Carex riparia, Carex elata, Carex gracilis*, a cross of *Carex gracilis* and *Carex elata, Juncus inflexu, Carex acutiformis, Scirpus lacustris, Iris pseudacorus, Carex rostrata, Phragmitis australis*.

3. The sewage treatment system of claim 2, wherein:
   the wastewater is treated by a sequence of plants of different species as follows: (a) *Juncus inflexus*, (b) *Iris pseudacorus*, (c) a cross of *Carex gracilis* and *Carex elata*, (d) *Carex elata*, (e) *Scirpus lacustris*, (f) *Iris pseudacorus*.

4. The sewage treatment system of claim 3, wherein:
   plants of the species (e) *Scirpus lacustris* and (f) *Iris pseudacorus* are arranged in a mixture with each other.

5. The sewage treatment system of claim 3, wherein:
   plants of species *Carex acutiformis* are arranged after the plants of species *Juncus inflexus* and the plants of species *Juncus inflexus* and species *Carex acutiformis* are arranged in a mixture with each other.

6. The sewage treatment system of claim 2, wherein:
   the wastewater is treated by a sequence of plants of different species as follows: (a) *Carex riparia*, (b) *Carex elata*, (c) *Carex rostrata*, (d) *Iris pseudacorus*, (e) *Juncus inflexus*, (f) *Scirpus lacustris*, (g) *Iris pseudacorus*.

7. The sewage treatment system of claim 6, wherein:
   plants of the species (b) *Carex elata* and (c) *Carex rostrata* are arranged in a mixture with each other.

8. The sewage treatment system of claim 6, wherein:
   plants of the species (f) *Scirpus lacustris* and (g) *Iris pseudacorus* are arranged in a mixture with each other.

9. The sewage treatment system of claim 6, wherein:
   plants of species *Carex acutiformis* and plants of species (d) *Iris pseudacorus* are in a numerical ratio of 1:4.

10. The sewage treatment system of claim 2, wherein:
    the wastewater is treated by a sequence of plants of different species as follows: (a) *Phragmitis australis*, (b) *Juncus inflexus*, (c) *Carex riparia*, (d) *Carex elata*, (e) *Carex rostrata*, (f) *Iris pseudacorus*, (g) *Scirpus lacustris*, (h) a cross of *Carex gracilis* and *Carex elata*, and (i) *Scirpus lacustris*.

11. The sewage treatment system of claim 10, wherein:
    plants of species (d) *Carex elata* and (e) *Carex rostrata* are arranged in a mixture with each other.

12. The sewage treatment system of claim 1, wherein:
    plants of at least two species are arranged in a mixture with each other in one plant basin.

13. The sewage treatment system of claim 1, wherein:
    the system includes at least six plant basins, and each plant basin holds a plant of a different species.

14. The sewage treatment system of claim 1, further comprising:
    devices for varying a direction of flow of the wastewater through a sequence of plants.

15. The sewage treatment system of claim 14, wherein:
    the devices cause the wastewater to flow in the horizontal and vertical directions.

16. The sewage treatment system of claim 1, further comprising:
    living filters.

17. The sewage treatment system of claim 16, wherein:
    a ball of algae *Cladophora aegagropila* is arranged in one of the plant basins.

18. The sewage treatment system of claim 16, wherein:
    a fern plant (163) and a natural sponge are arranged in a plant basin.

19. The sewage treatment system of claim 16, wherein:
    microbes and cyanobacteria are arranged on roots of the plants, and carbon dioxide is passed through the wastewater.

20. The sewage treatment system of claim 1, further comprising:
    artificially-produced filters.

* * * * *